United States Patent
Ratasuk et al.

(10) Patent No.: US 9,307,556 B2
(45) Date of Patent: Apr. 5, 2016

(54) SHARED ACCESS OF UPLINK CARRIER

(71) Applicant: Nokia Siemens Networks Oy, Espoo (FI)

(72) Inventors: Rapeepat Ratasuk, Hoffman Estates, IL (US); Ravindra Moorut, Tower Lakes, IL (US); Joseph Schumacher, Glen Ellyn, IL (US); James Kepler, Buffalo Grove, IL (US); Anatoly Andrianov, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 68 days.

(21) Appl. No.: 13/948,673

(22) Filed: Jul. 23, 2013

(65) Prior Publication Data
US 2015/0029943 A1    Jan. 29, 2015

(51) Int. Cl.
H04W 74/04 (2009.01)
H04W 16/14 (2009.01)
H04L 5/00 (2006.01)
H04W 72/12 (2009.01)

(52) U.S. Cl.
CPC ............. *H04W 74/04* (2013.01); *H04L 5/00* (2013.01); *H04W 16/14* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 8,498,241 B1 * | 7/2013 | Talley et al. | 370/328 |
| 2009/0181712 A1 * | 7/2009 | Xu | 455/522 |
| 2009/0257387 A1 * | 10/2009 | Gholmieh et al. | 370/329 |
| 2010/0081449 A1 | 4/2010 | Chaudhri et al. | 455/452.2 |
| 2010/0172290 A1 * | 7/2010 | Nam et al. | 370/328 |
| 2010/0177654 A1 * | 7/2010 | Charbit et al. | 370/252 |
| 2010/0330919 A1 | 12/2010 | Gurney et al. | 455/67.11 |
| 2011/0075629 A1 * | 3/2011 | Seo et al. | 370/330 |
| 2011/0081856 A1 | 4/2011 | Johansson et al. | 455/7 |
| 2011/0081913 A1 * | 4/2011 | Lee et al. | 455/450 |
| 2011/0134874 A1 * | 6/2011 | Nakao et al. | 370/329 |
| 2011/0170508 A1 * | 7/2011 | Xue et al. | 370/329 |
| 2011/0194516 A1 * | 8/2011 | Aiba et al. | 370/329 |
| 2011/0235602 A1 * | 9/2011 | Ji et al. | 370/329 |
| 2011/0237238 A1 * | 9/2011 | Hassan et al. | 455/422.1 |
| 2011/0280206 A1 * | 11/2011 | Johansson et al. | 370/329 |
| 2012/0120887 A1 * | 5/2012 | Deaton et al. | 370/329 |
| 2012/0134275 A1 * | 5/2012 | Choi et al. | 370/241 |
| 2012/0207038 A1 * | 8/2012 | Choi et al. | 370/252 |

(Continued)

FOREIGN PATENT DOCUMENTS

| | | |
|---|---|---|
| GB | 2477649 A | 8/2011 |
| GB | 2486296 A | 6/2012 |
| WO | WO-2012062483 A1 | 5/2012 |

OTHER PUBLICATIONS

Marques, Paulo; Stand; IEEEP1900-6; Document Title: Geolocation Database Overview; Document Date: Sep. 15, 2010; (39 pages).

*Primary Examiner* — Dung B Huynh
(74) *Attorney, Agent, or Firm* — Harrington & Smith (57) ABSTRACT

A method includes configuring user equipment to support use of one or more carriers for authorized shared access. The configuring is performed to emphasize use of a first set of a plurality of carriers over use of a second set of the plurality of carriers. The second set comprises the one or more carriers for authorized shared access. The method also includes communicating with the user equipment using the first and second sets of carriers. Apparatus, computer programs, and program products are also disclosed.

20 Claims, 7 Drawing Sheets

(56) References Cited

U.S. PATENT DOCUMENTS

| | | | |
|---|---|---|---|
| 2012/0218954 A1* | 8/2012 | Barbieri et al. | 370/329 |
| 2012/0250631 A1* | 10/2012 | Hakola et al. | 370/329 |
| 2012/0257513 A1* | 10/2012 | Yamada | 370/248 |
| 2012/0307781 A1* | 12/2012 | Enomoto et al. | 370/329 |
| 2012/0307869 A1* | 12/2012 | Charbit et al. | 375/132 |
| 2013/0010687 A1* | 1/2013 | Gaal et al. | 370/328 |
| 2013/0017792 A1 | 1/2013 | Miller, II | 455/62 |
| 2013/0034067 A1* | 2/2013 | Umesh et al. | 370/329 |
| 2013/0034073 A1* | 2/2013 | Aiba et al. | 370/329 |
| 2013/0039171 A1* | 2/2013 | Gaal et al. | 370/228 |
| 2013/0121272 A1* | 5/2013 | Barbieri et al. | 370/329 |
| 2013/0142129 A1* | 6/2013 | Rinne et al. | 370/329 |
| 2013/0163543 A1* | 6/2013 | Freda et al. | 370/329 |
| 2013/0188552 A1* | 7/2013 | Kazmi et al. | 370/315 |
| 2013/0195073 A1* | 8/2013 | Chen et al. | 370/331 |
| 2013/0235826 A1* | 9/2013 | Nakao et al. | 370/329 |
| 2013/0273924 A1* | 10/2013 | Hakola et al. | 455/450 |
| 2013/0315114 A1* | 11/2013 | Seo et al. | 370/280 |
| 2013/0322371 A1* | 12/2013 | Prakash et al. | 370/329 |
| 2013/0336156 A1* | 12/2013 | Wei et al. | 370/252 |
| 2013/0336175 A1* | 12/2013 | Um et al. | 370/280 |
| 2013/0343288 A1* | 12/2013 | Ratasuk et al. | 370/329 |
| 2014/0098774 A1* | 4/2014 | Gao et al. | 370/329 |
| 2014/0161002 A1* | 6/2014 | Gauvreau et al. | 370/280 |
| 2014/0162617 A1* | 6/2014 | Mueck et al. | 455/418 |
| 2014/0162666 A1* | 6/2014 | Ratasuk et al. | 455/450 |
| 2014/0162667 A1* | 6/2014 | Mueck | 455/450 |
| 2014/0185580 A1* | 7/2014 | Fang et al. | 370/330 |
| 2014/0192685 A1* | 7/2014 | Mueck et al. | 370/280 |
| 2014/0204854 A1* | 7/2014 | Freda et al. | 370/329 |
| 2014/0321425 A1* | 10/2014 | Mueck et al. | 370/331 |
| 2014/0335876 A1* | 11/2014 | Ratasuk et al. | 455/450 |
| 2014/0342745 A1* | 11/2014 | Bhushan et al. | 455/450 |
| 2015/0055589 A1* | 2/2015 | Yerramalli et al. | 370/329 |

* cited by examiner

SHARED ACCESS OF UPLINK CARRIER

TECHNICAL FIELD

This invention relates generally to radio frequency communications and, more specifically, relates to shared access of an uplink carrier.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

In the United States, some spectrum in the federal AWS system will become available to cellular operators on an authorized shared access (ASA) basis. Under ASA, a secondary user will share the spectrum with the federal government (the primary user) through authorization by the primary user. When authorization is granted, the secondary user has exclusive use of the spectrum. However, the primary user has priority access and can reacquire the spectrum as needed.

Currently, the 1755-1780 uplink and the 2155-2180 MHz downlink spectra are expected to be made available for LTE around 2015. This is 2×25 MHz of spectrum next to current AWS Band Class 4 (1710-1755/2110-2155 MHz) where companies are deploying LTE. The downlink portion will be cleared and auctioned off. The uplink portion, which is currently used by Federal Government users, may be available to mobile network operators via ASA.

The mobile network operators will have exclusive use of DL spectrum but will share UL spectrum with Federal Government users on an ASA basis. It would be beneficial to provide techniques to share the UL spectrum.

SUMMARY

This section contains examples of possible implementations and is not meant to be limiting.

An exemplary embodiment is a method that includes configuring user equipment to support use of one or more carriers for authorized shared access. The configuring is performed to emphasize use of a first set of a plurality of carriers over use of a second set of the plurality of carriers. The second set comprises the one or more carriers for authorized shared access. The method includes communicating with the user equipment using the first and second sets of carriers.

An additional exemplary embodiment includes a computer program, comprising code for configuring user equipment to support use of one or more carriers for authorized shared access, wherein the configuring is performed to emphasize use of a first set of a plurality of carriers over use of a second set of the plurality of carriers, wherein the second set comprises the one or more carriers for authorized shared access; and code for communicating with the user equipment using the first and second sets of carriers; when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: configuring user equipment to support use of one or more carriers for authorized shared access, wherein the configuring is performed to emphasize use of a first set of a plurality of carriers over use of a second set of the plurality of carriers, wherein the second set comprises the one or more carriers for authorized shared access; and communicating with the user equipment using the first and second sets of carriers.

An exemplary computer program product includes a memory bearing computer program code embodied therein for use with a computer. The computer program code includes: code for configuring user equipment to support use of one or more carriers for authorized shared access, wherein the configuring is performed to emphasize use of a first set of a plurality of carriers over use of a second set of the plurality of carriers, wherein the second set comprises the one or more carriers for authorized shared access; and code for communicating with the user equipment using the first and second sets of carriers.

Another exemplary embodiment is an apparatus comprising means for configuring user equipment to support use of one or more carriers for authorized shared access, wherein the configuring is performed to emphasize use of a first set of a plurality of carriers over use of a second set of the plurality of carriers, wherein the second set comprises the one or more carriers for authorized shared access; and means for communicating with the user equipment using the first and second sets of carriers.

DETAILED DESCRIPTION OF THE DRAWINGS

Figure 1:
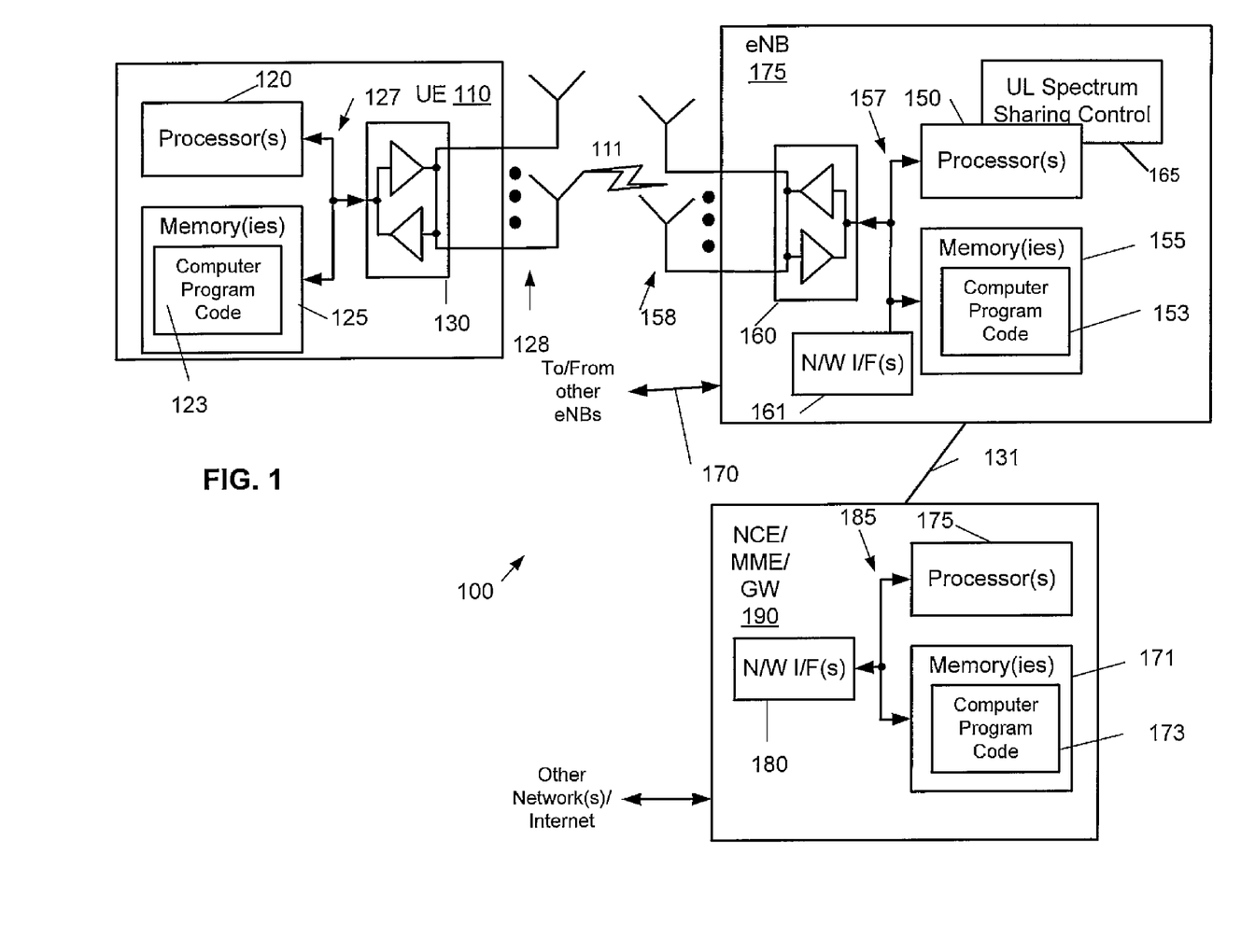
FIG. 1 illustrates a block diagram of an exemplary system in which the exemplary embodiments may be practiced.

Prior to proceeding with additional description of problems briefly mentioned above, reference may be made to FIG.

1, which illustrates a block diagram of an exemplary system in which the exemplary embodiments may be practiced.

In FIG. 1, a UE 110 is in wireless communication with a mobile network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. In an exemplary embodiment, the one or more memories 125 and the computer program code 123 are configured to, with the one or more processors 120, cause the user equipment 110 to perform one or more operations. The UE 110 communicates with eNB 175 via link 111.

The eNB 175 includes one or more processors 150, one or more memories 155, one or more network interfaces (N/W I/F(s)) 161, and one or more transceivers 160 interconnected through one or more buses 157. Additionally, the eNB 175 includes a UL spectrum sharing control module 165. The one or more transceivers 160 are connected to one or more antennas 158. The one or more memories 155 include computer program code 153. In an exemplary embodiment, the computer program code 153 comprises the UL spectrum sharing control module 165 and the one or more memories 155 and the computer program code 153 are configured to, with the one or more processors 150, cause the NB 175 to perform one or more of the operations as described herein. In another exemplary embodiment, the UL spectrum sharing control module 165 is implemented as circuitry, e.g., in the one or more processors 150. In a further embodiment, the UL spectrum sharing control module 165 could be implemented in part using the computer program code 153 and in part using circuitry. The one or more network interfaces 161 communicate over a network such as the networks 170 and 131. Two or more eNBs 175 communicate using, e.g., network 170. The network 170 may be wired or wireless or both and may implement, e.g., an X2 interface.

The eNB 175 forms one or more cells. Put differently, a cell makes up part of an eNB. That is, there can be multiple cells per eNB. For instance, there could be three cells for a single eNB carrier and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The mobile network 100 may include a network control element (NCE) 190 that may include MME/SGW functionality, and which provides connectivity with a further network, such as a telephone network and/or a data communications network (e.g., the Internet). The eNB 175 is coupled via a network 131 to the NCE 190. The network 131 may be implemented using, e.g., an S1 interface. The NCE 190 includes one or more processors 175, one or more memories 171, and one or more network interfaces (N/W I/F(s)) 180, interconnected through one or more buses 185. In an exemplary embodiment, the one or more memories 171 include computer program code 173. The one or more memories 171 and the computer program code 173 are configured to, with the one or more processors 175, cause the NCE 185 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers or integrated circuits, microprocessors, digital signal processors (DSPs) and processors based on a multi-core processor architecture, as non-limiting examples.

In general, the various embodiments of the user equipment 110 can include, but are not limited to, cellular telephones such as smart phones, tablets with wireless capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
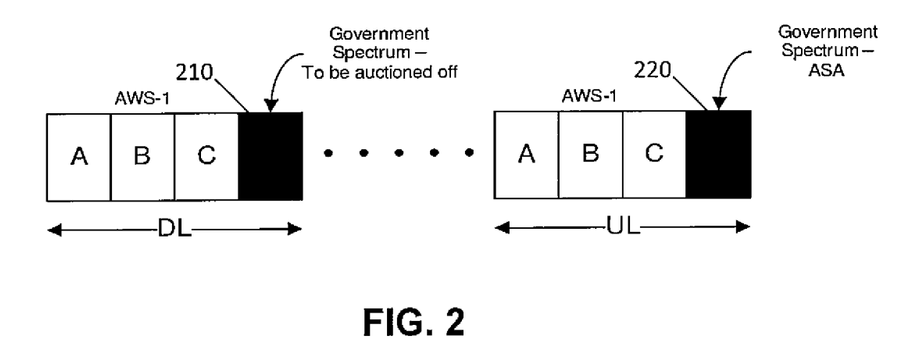
FIG. 2 illustrates the new 1.7/2.1 GHz AWS spectrum in the United States.

More description of problems with conventional systems is now presented. As stated above, under ASA, a secondary user will share the spectrum with the federal government (the primary user) through authorization by the primary user. When authorization is granted, the secondary user has exclusive use of the spectrum. However, the primary user has priority access and can reacquire the spectrum as needed. The mobile network operators will have exclusive use of the DL spectrum but will share UL spectrum with Federal Government users on an ASA basis. This is illustrated in FIG. 2, which shows 1.7 GHz AWS spectrum in downlink and 2.1 GHz AWS spectrum in uplink. The DL spectrum 210 to be auctioned off will be acquired by mobile operators for exclusive use, but the government spectrum 220 for ASA will be shared by the government and the mobile network operators. That is, when federal government users need the spectrum, mobile network operators will only have to clear the UL spectrum 220. Many mobile network operators are interested in earlier, even if limited, usage by sharing spectrum 220 with federal government users.

Figure 3:
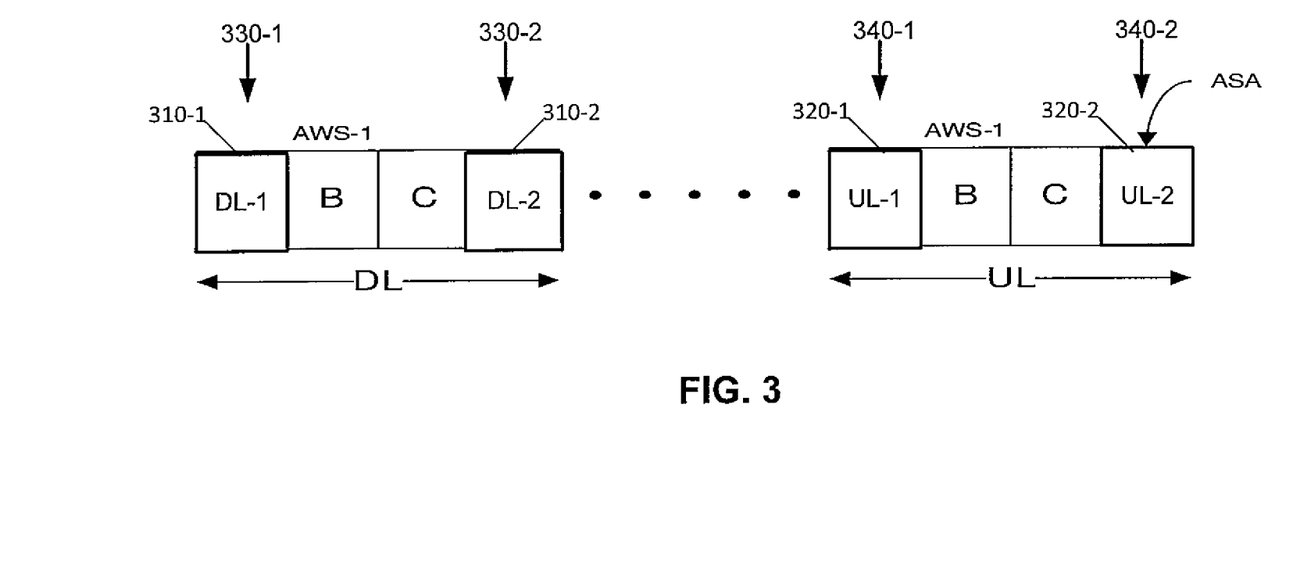
FIG. 3 illustrates possible spectra deployment for a mobile network operator after new spectrums have been acquired.

One possible spectra deployment for a mobile network operator after new spectra have been acquired is shown in FIG. 3. In this example, the mobile network operator uses downlink spectra DL-1 310-1 and DL-2 310-2 (corresponding to carriers 330-1 and 330-2, respectively) and uplink spectra UL-1 320-1 and UL-2 320-2 (corresponding to carriers 340-1 and 340-2, respectively). It is noted that for simplicity, a carrier and its bandwidth will be used interchangeably herein. It should be noted the UL spectrum 320-2 corresponds to the ASA uplink carrier 340-2. To efficiently utilize the ASA uplink carrier 340-2 while providing a fast and efficient method for evacuation of the ASA uplink carrier 340-2, it is best to deploy the ASA uplink carrier 340-2 via carrier aggregation (CA). However, it is assumed that there will be a mixture of CA-capable (Rel-10 and beyond) and legacy (Rel-8/9) UEs attached to an eNB 175. As is known, CA-capable UEs 110 can use multiple carriers 340 to send and, simultaneously with sending, use multiple carriers 330 to receive, while legacy (i.e., non-CA-capable in this context) UEs 110 can use only a single carrier 340 to send and a single carrier 330 to receive. In a CA system, a UE is configured with a primary carrier (on a primary cell) and one or more secondary carriers (on one or more secondary cells). The UE 110 is configured to use preferentially the primary carrier and to use the secondary carrier as decided by the eNB, for example in response to the primary carrier meeting certain conditions (e.g., being too congested), when the signal-to-noise ratio is better on the secondary carrier, or when certain applications or traffic types are being served. As noted above, the primary carrier/primary cell and secondary carrier/secondary cell may be part of the same eNB 175. Exemplary embodiments herein address at least the following issues:

1. How to set up a system to allow fast and seamless evacuation of the ASA UL carrier considering a mixture of CA-capable and legacy UEs.

2. How to support carrier deployment and channel configurations that will provide both CA-capable and legacy UEs efficient utilization of the system.

3. How to optimize PUCCH & PRACH overhead.

4. How to operate the ASA carrier 340-2 without the PUCCH.

The techniques disclosed herein should not require standards changes.

It is assumed that fast evacuation (i.e., within 100-200 ms after receiving the evacuation command) of the UL ASA carrier 340-2 is paramount to demonstrating to the FCC feasibility of spectrum sharing in the uplink portion. Exemplary techniques herein use carrier aggregation (CA) and assume a mixture of CA-capable (Rel-10 and beyond) and legacy (Rel-8/9) UEs. Briefly, there are three main concepts disclosed herein:

1. Carrier deployment where the ASA UL carrier 340-2, also referred to as the UL-2 carrier, is only used by CA-capable UEs for data transmission (i.e., the carrier UL-2 is only configured as a secondary uplink carrier without any provisioning for control). The other UL carrier 340-1, also referred to at the UL-1 carrier, is provisioned to support two DL carriers 330-1,2 in a certain manner (e.g., the carrier UL-1 is configured as the only primary uplink carrier). For example, UL-1 is configured to carry all feedback (e.g. ACK/NACK, CQI, SRS) and other control information related to the two DL carriers.

2. Data and control balancing. For instance, PUSCH/PUCCH partitioning on the UL-1 carrier 340-1 may be based on one of more of the following factors: (1) number of users; (2) mixture of CA-capable and legacy UEs; (3) priority or service level; (4) ASA evacuation time; or (5) acceptable level of interference to ASA.

3. Use of ASA UL carrier 340-2 also as primary uplink carrier while supporting fast (e.g., near real-time) evacuation of the spectrum. The carrier 340-2 may be used, e.g., if the bandwidth of the UL-1 carrier 340-1 is not sufficient or UE data performance is suffering, or if the required evacuation time is sufficiently long. The use of the carrier 340-2 may be performed, e.g., by configuring UEs not to use the PUCCH on the UL-2 carrier 340-2.

The exemplary embodiments herein are implementation-specific and performed exclusively at the eNB 175. More detailed description and embodiments are described below.

Figure 5:
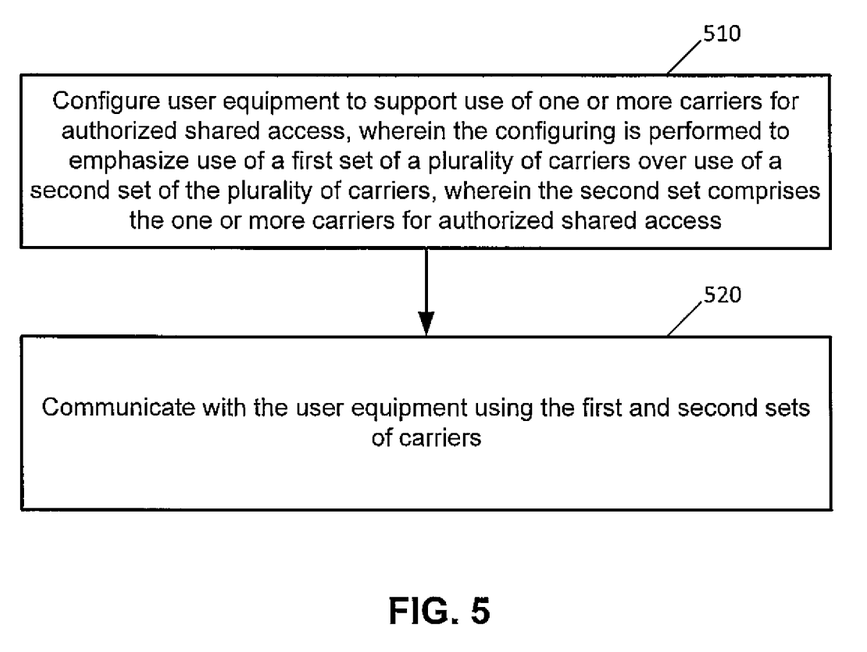
FIG. 5 is a block diagram of an exemplary logic flow diagram for shared access of an uplink carrier, and that illustrates the operation of an exemplary method, a result of execution of computer program instructions embodied on a computer readable memory, and/or functions performed by logic implemented in hardware, in accordance with an exemplary embodiment herein.

As a general matter, techniques are provided to support a system with a carrier for authorized shared access and UEs that either support CA or do not support CA. Turning to FIG. 5, a block diagram is shown of an exemplary logic flow diagram for shared access of an uplink carrier. FIG. 5 illustrates the operation of an exemplary method, a result of execution of computer program instructions embodied on a computer readable memory, and/or functions performed by logic implemented in hardware, in accordance with an exemplary embodiment herein. The blocks in FIG. 5 are performed by the UL spectrum sharing control module 165, which causes the eNB 175 to perform the operations in the blocks. For simplicity, the blocks in FIG. 5 (and FIGS. 6-8) are assumed to be performed by the eNB 175. The blocks in FIG. 5 (and FIGS. 6-8) may also be considered to be interconnected means for performing functions in the blocks.

In block 510, the eNB 175 configures user equipment to support use of one or more carriers for authorized shared access. The configuring is performed to emphasize use of a first set of a plurality of carriers over use of a second set of the plurality of carriers. The second set of the plurality of carriers includes the one or more carriers for authorized shared access. For instance, as described briefly above and in more detail below, the UL-2 carrier may still be used, e.g., as a secondary carrier for UEs that support CA and, based on certain criteria, for UEs that support CA and UEs that do not support CA. However, the eNB 175 will emphasize the use of the UL-1 carrier (over use of the UL-2 carrier) through various techniques described below. In block 520, the eNB 175 communicates with the user equipment using the first and second sets of carriers.

It is noted that the primary examples herein involve a single UL-1 carrier and a single UL-2 carrier, where the single UL-2 carrier is for authorized shared access. However, there could be multiple UL-1 carriers (that is, multiple carriers not used for authorized shared access) and/or multiple UL-2 carriers (that is, multiple carriers used for authorized shared access). Thus, a set of carriers for UL-1 carriers includes a single or multiple carriers and a set of carriers for UL-2 carriers includes a single or multiple carriers. Furthermore, most of the examples herein relate to FDD operation. Nonetheless, TDD operation may also be implemented, for instance, where the bandwidth for the UL-1 carrier(s) or UL-2 carrier(s) can be used for UL and for DL. Thus, in block 520, the communication will be reception by the eNB 175 of information from the UEs 110 in UL or transmission from the eNB 175 to the UEs 110 in DL.

Figure 6:
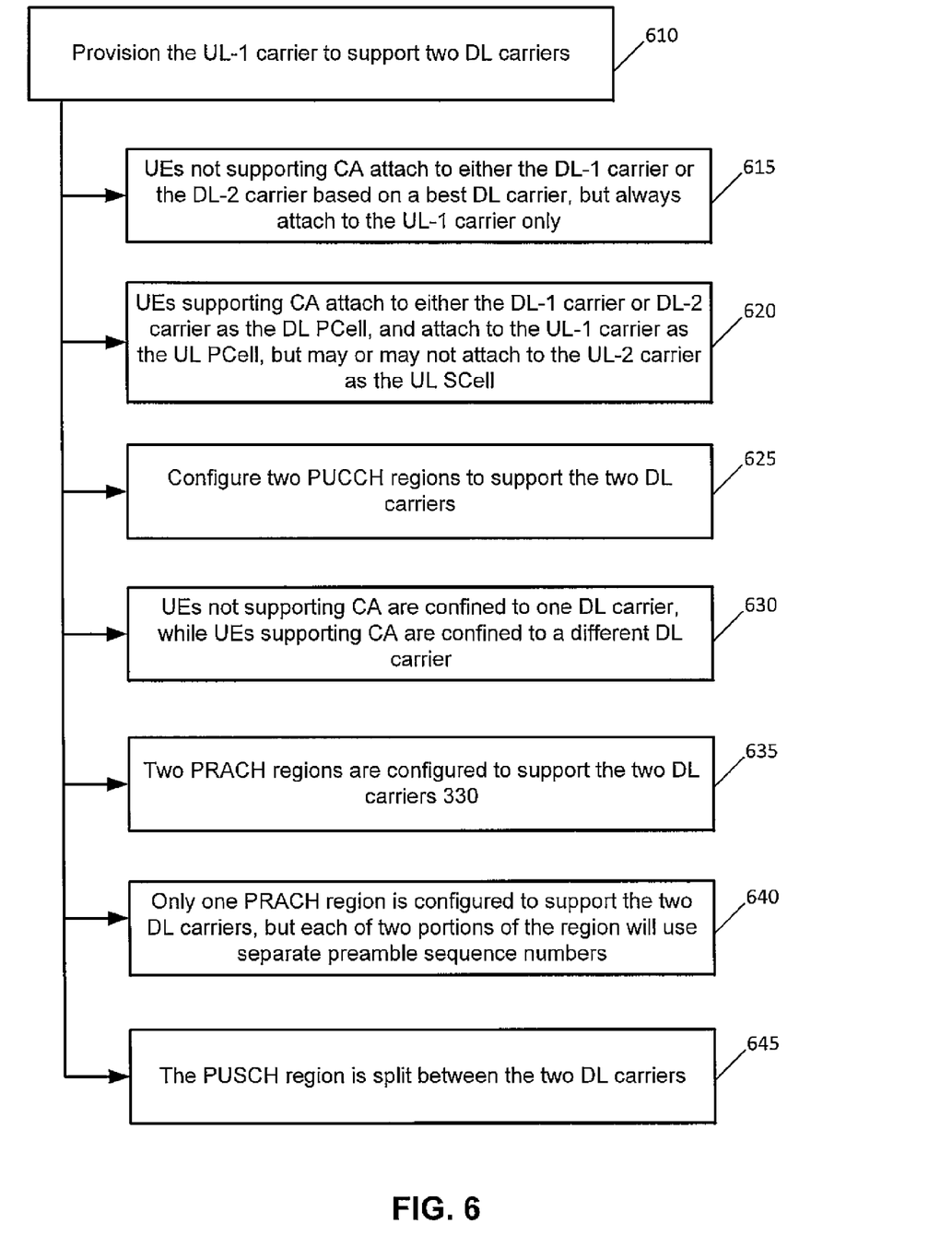
FIGS. 6, 7, and 8 are block diagrams of exemplary logic flow diagrams for one of the blocks in FIG. 5, and that illustrate the operation of an exemplary method, a result of execution of computer program instructions embodied on a computer readable memory, and/or functions performed by logic implemented in hardware, in accordance with exemplary embodiments herein.
Figure 7:
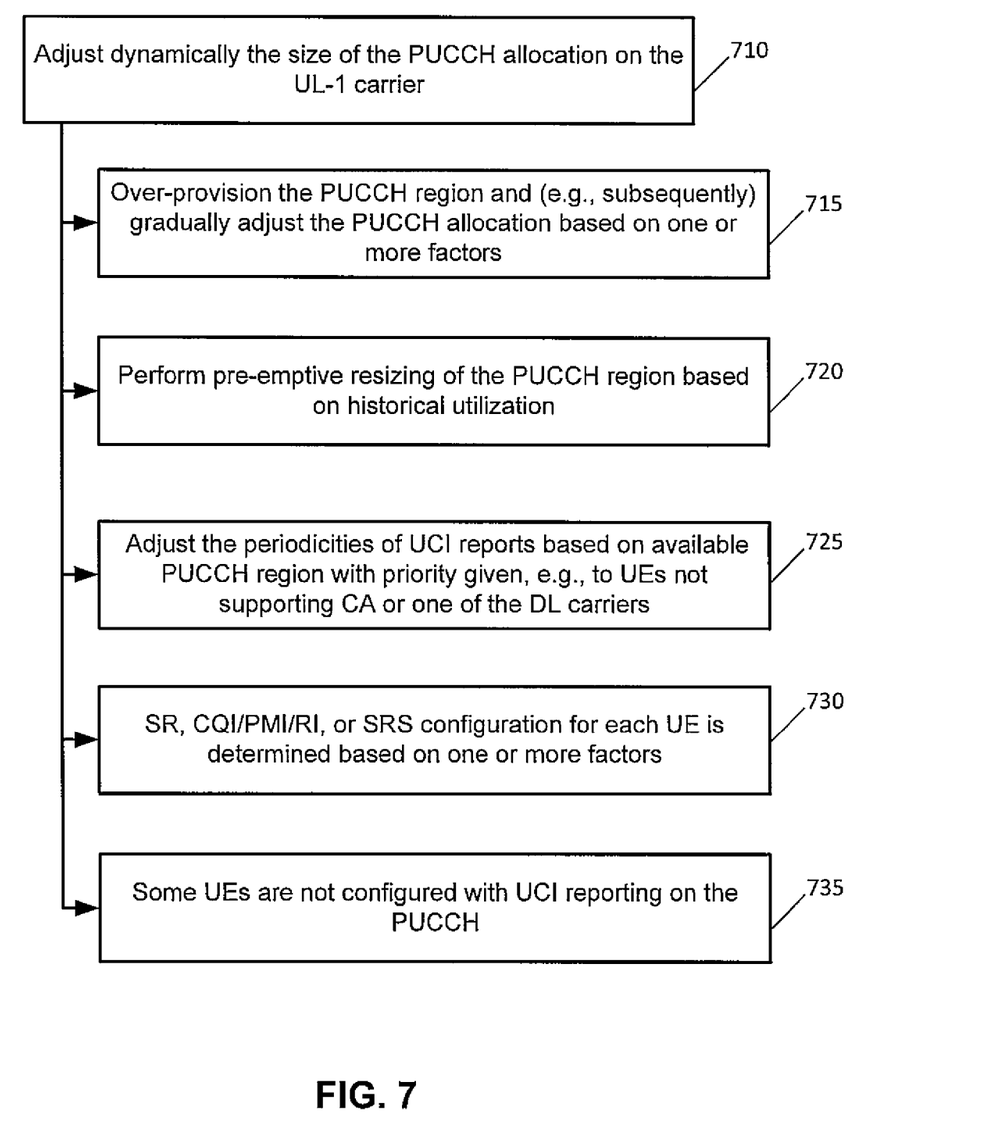
Figure 8:
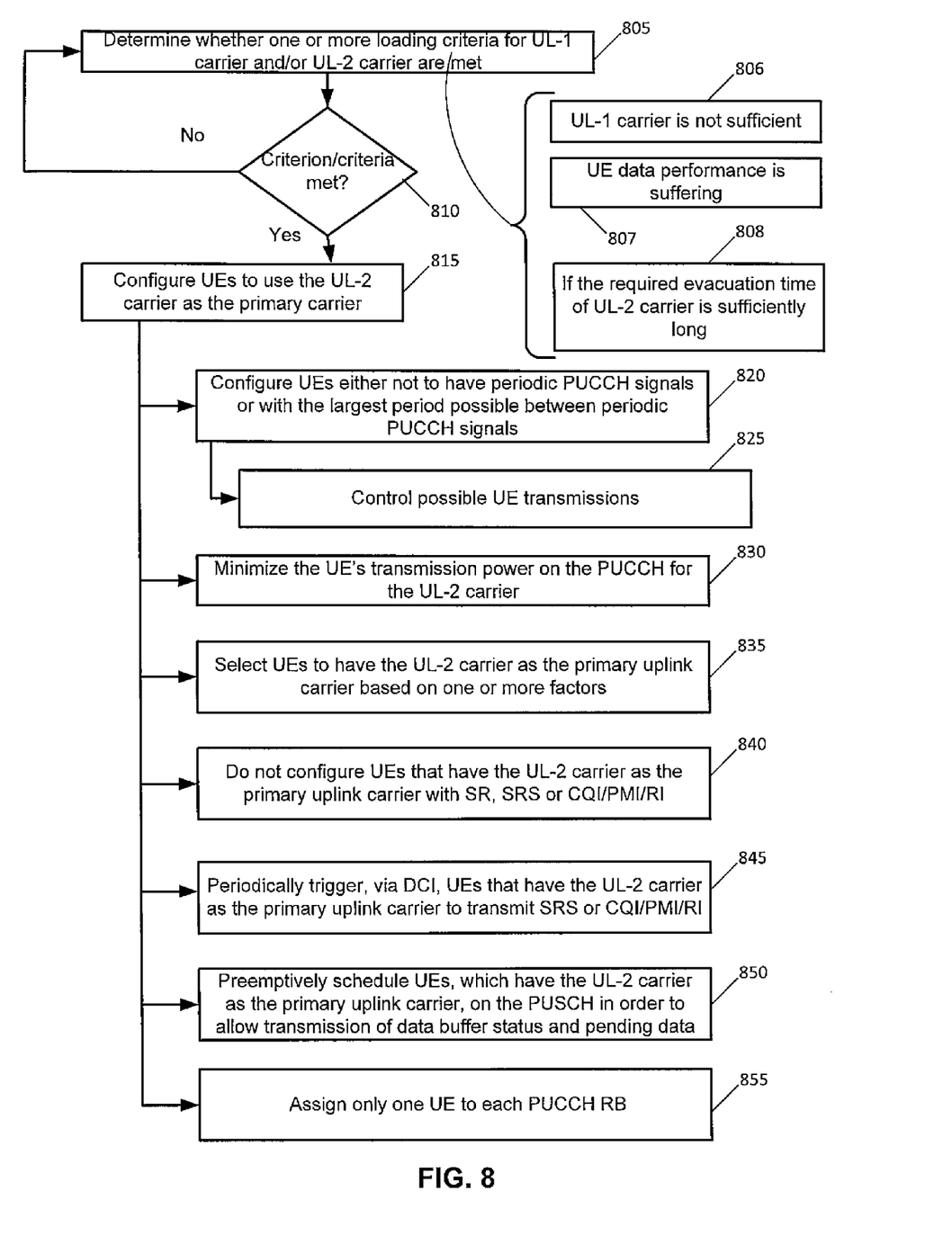

FIGS. 6, 7, and 8 are block diagrams of exemplary logic flow diagrams for block 510 in FIG. 5. For instance, these figures provide examples of how the configuring may be performed to emphasize use of the "first" uplink carrier (UL-1) over use of the "second" uplink carrier (UL-2) for authorized shared access. These figures further illustrate the operation of an exemplary method, a result of execution of computer program instructions embodied on a computer readable memory, and/or functions performed by logic implemented in hardware, in accordance with exemplary embodiments herein. FIG. 6 is directed to a first exemplary concept, FIG. 7 is directed to a second exemplary concept, and FIG. 8 is directed to a third exemplary concept.

In a first concept, to prevent UEs from connecting to the UL-2 carrier 340-2, the system is configured with the following carrier configurations (using FIG. 3 as an example): UEs may use (1) DL-1 carrier 330-1 and UL-1 carrier 340-1; and (2) DL-2 carrier 330-2 and UL-1 carrier 340-1. The first concept is described in reference to FIG. 6, which is a block diagram of an exemplary logic flow diagram for block 510 of FIG. 5.

Figure 4:
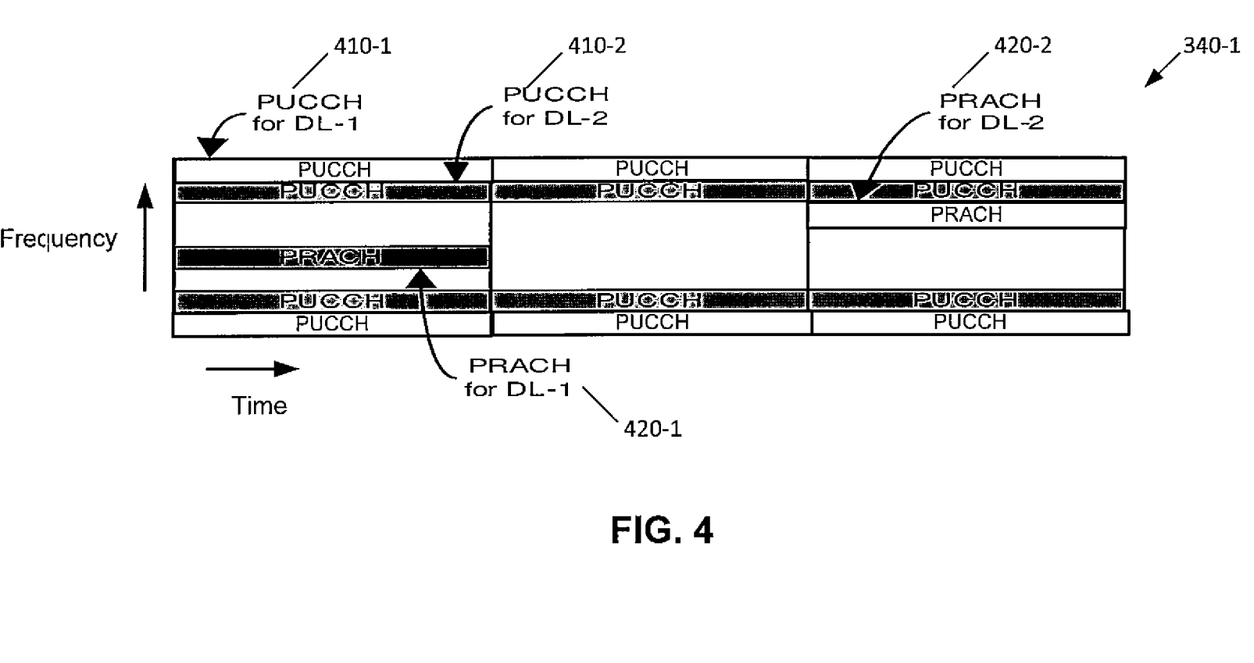
FIG. 4 illustrates a configuration of the UL-1 carrier to support two DL carriers in an exemplary embodiment.

The first concept includes the eNB 175 provisioning (block 610) the UL-1 carrier 340-1 to support two DL carriers 330-1,2. In an exemplary embodiment, as shown in FIG. 4, the UL-1 carrier 340-1 is configured to have two different PRACH regions 420-1,2 and PUCCH regions 410-1,2. The PUCCH region 410-2 for DL-2 can be configured by over-provisioning the PUCCH region then assigning the inner resource blocks (e.g., resource blocks toward the middle of the band as opposed to at the band edges) to UEs sending uplink information corresponding to the DL-2 carrier 330-2. The PRACH regions can be configured by using different PRACH configuration (e.g., time and/or frequency placement, periodicity, or base sequences) for each of the regions.

In block 615 of FIG. 6, Rel-819 UEs attach to either the DL-1 carrier 330-1 or the DL-2 carrier 330-2 based on a best DL carrier (e.g., as determined by RSRP or RSRQ measurements), but always attach to the UL-1 carrier 340-1 only. In block 620, Carrier Aggregation (CA) capable UEs 110 (Rel-10 and beyond) attach to either the DL-1 carrier or DL-2 carrier as the DL P Cell, and the UL-1 carrier as the UL PCell. Then the UE 110 can connect to the other DL or UL carriers using CA. So the possible configurations for CA-capable UEs 110 are the following:

1. PCells: DL-1, UL-1; SCells: DL-2, UL-2;
2. PCells: DL-2, UL-1; SCells: DL-1, UL-2;
3. PCells: DL-1, UL-1; SCell: DL-2; and
4. PCells: DL-2, UL-1; SCell: DL-1.

In one embodiment, illustrated in block 625, two PUCCH regions 410-1,2 are configured to support the two DL carriers 330-1,2. Note that the PUCCH region 410-2 for the DL-2 carrier 330-2 will contain RBs for both DL-1 and DL-2, but only the inner resource blocks will be used for DL-2. These two regions 410-1,2 may be configured separately and broadcasted on the SIBs of the respectively DL carriers, so the configuration of the regions is transparent to the UEs.

In another embodiment, illustrated in block 630, Rel-8/9 UEs 110 may be confined to one DL carrier 330 (e.g., through handover after initial attachment), while Rel-10 and beyond UEs may be confined to a different DL carrier 330. This helps in UE and feature management, especially when carrier aggregation is supported.

In another embodiment, illustrated by block 635, two PRACH regions 420-1,2 are configured to support the two DL carriers 330. These two regions 420-1,2 may be configured separately and broadcasted on the SIBs of the respectively DL carriers 330, so the configuration of the regions is transparent to the UEs. To avoid confusion, each region may use separate preamble sequence numbers (e.g., PRACH region 420-1 for DL-1 uses preambles 0-31, while PRACH region 420-2 for DL-2 uses preambles 32-63). This can be performed through PRACH preamble reservation (e.g., via RACH-ConfigDedicated information element).

In another embodiment, shown in block 640, only one PRACH region 420 is configured to support the two DL carriers 330, but each portion (corresponding to a DL carrier 330) of the region will use separate preamble sequence numbers (e.g., a first portion of a PRACH region 420 for the DL-1 carrier 330-1 uses preambles 0-31, while a second portion of the PRACH region 420 for DL-2 uses preambles 32-63). This can be done through PRACH preamble reservation (e.g., via RACH-ConfigDedicated information element) where different preambles are reserved for different PRACH regions.

In another embodiment, shown in block 645, the PUSCH region is split between the two DL carriers 330. The PUSCH region is the region (e.g., in FIG. 4) that is not assigned to PUCCH or PRACH. That is, each carrier is assigned a unique range of resource blocks. This is in case separate schedulers (in eNB 175) are used, so there will not be a PUSCH assignment conflict.

Turning to a second concept, which is illustrated using FIG. 7, with only the UL-1 carrier 340-1 configured as the UL carrier as shown in FIG. 4, then a large portion of the UL-1 carrier may be taken up by the PUCCH regions 410 and the PRACH regions 420. Also, with CA-capable UEs, a larger PUCCH region 410 will be needed since the CA-capable UEs 110 need to transmit CQI/PMI/RI for two DL carriers 330. As a result, the PUCCH region 410 and PRACH region 420 may consume a large portion of UL-1 bandwidth 320-1. This may limit the amount of uplink data transmission (e.g., in the PUSCH of the UL-1 carrier) by the system.

For CA-capable UEs 110, this is not a problem since these UEs can be scheduled to transmit data on the UL-2 carrier 340-2. For Rel-8/9 UEs, however, UL throughput may be limited by the available PUSCH region on UL-1. This may also limit their DL throughput since the UL is used to carry higher-layer acknowledgments (e.g., TCP/IP ACKs) for DL data. To minimize this issue, a good balance is needed for data versus control region in the UL-1 carrier.

In one embodiment, the size of the PUCCH allocation on the UL-1 carrier 340-1 is adjusted dynamically (block 710). The following exemplary and non-limiting set of techniques may be used:

1) By over-provisioning of PUCCH and gradually adjusting the PUCCH allocation (e.g., smaller) based on one or more factors (block 715) including number of users in the cell, system load, resource block utilization factor, a mixture of CA-capable and legacy UEs 110, mixture of UE priorities or service levels, mixture of service types, ASA evacuation time, and acceptable level of interference to ASA. This will create empty PUCCH regions 410 at the band edges that can be used for data transmission. Band edges are the resource blocks (or frequency regions) that are at the edge of the assigned band. For example, if the carrier spans 1720-1740 MHz (20 MHz BW) with center carrier frequency of 1730 MHz, the band edges are the resource blocks around 1720 and 1740. To over-provision the PUCCH is to allocate more RBs to the PUCCH than strictly necessary for the expected UE uplink data.

2) Through (block 720) pre-emptive resizing of the PUCCH based on historical utilization (e.g., one or more of time of day, cell location, UE arrival rate, UE data, or factors as described above, and the like).

3) Through (block 725) adjusting the periodicities of the UCI reports from UEs based on available PUCCH region 410 with priority given, e.g., to legacy UEs or one of the DL carriers 330.

In another embodiment, illustrated by block 730, the SR, CQI/PMI/RI, or SRS configuration for each UE is determined based on one of more of the following factors: size of the PUCCH resource (e.g., region); number of users in the cell; mixture of CA-capable and legacy UEs; priority or service level; service type; ASA evacuation time; acceptable level of interference to ASA; or location information. Some UEs may not have SR, CQI/PMI/RI, or SRS configured if there are insufficient PUCCH resources.

In another embodiment, shown in block 735, some UEs are not configured with UCI reporting on the PUCCH as described in the third concept, described immediately below.

Concerning a third concept, illustrated by FIG. 8, it is determined (block 805) whether one or more loading criteria for the UL-1 carrier and/or the UL-2 carrier are met. The criteria include (block 806) whether the UL-1 carrier 340-1 is not sufficient (e.g., to hold the uplink information for both DL carriers) and/or (block 807) whether UE data performance is suffering (e.g., does not meet a level; the performance could suffer because most of the UL-1 carrier is being used to support PUCCH region 410 and the PRACH region 420, or because there are too many UEs 110, thereby overloading the UL-1 carrier with information), and/or (block 808) if the required evacuation time of the UL-2 carrier is sufficiently long. Concerning the required evacuation time being sufficiently long, to use the UL-2 carrier as the primary uplink carrier means that some uplink control channels must be provisioned (e.g., for ACK/NACK or CQI feedback). Unlike a data channel that can be turned off almost instantaneously (i.e., by not scheduling any UL data transmission), there may be periodic transmission on the control channel (e.g., CQI report). Furthermore, to turn off transmission on the control channels requires messaging on the data channels. So to turn off control channels will require some time. If this time is longer than the evacuation time, then it is possible to use the UL-2 carrier as primary uplink carrier. If not, the use of the UL-2 carrier will be generating interference to the primary user due to some transmission on the control channels.

If the one or more criteria are not met (block 810=No), the flow in FIG. 8 proceeds to block 805. If so (block 810=Yes), then UEs may also be configured to use the UL-2 carrier 340-2 as the primary carrier (block 815). However, to support fast (i.e., near real-time) evacuation of the spectrum, UEs can use the UL-2 carrier as the primary carrier but will be configured either not to have periodic PUCCH signals or with the largest period possible between periodic PUCCH signals (block 820). As a result, possible UE transmissions are controlled by the eNB (block 825)—e.g., the transmissions are either scheduled by the eNB (e.g., PUSCH) or in response to a transmission by the eNB (e.g., ACK/NAK). So the eNB 175 can quickly stop any UL transmission in the UL-2 carrier by not scheduling data on the uplink or downlink for the affected UEs. However, these users will have degraded performance, since SR, SRS, or CQI/PMI/RI transmissions are not configured or have very long periods assigned to them. In addition, the eNB 175 can configure very low nominal uplink power level (e.g. via selecting the appropriate value for the p0-NominalPUCCH parameter in LTE) so as to minimize the UE's transmission power on the PUCCH (block 830) for UL-2 carrier. This can be used, for example, to prevent unintended UE behaviors (e.g., in case UE must be configured with SR, CQI/PMI/RI, or SRS, or in the case that system design always requires PUCCH to be configured for each UE).

In one embodiment, illustrated by block 835, UEs are selected to have the UL-2 carrier as the primary carrier based on one or more of the following factors: number of users in the cell; mixture of CA-capable and legacy UEs; priority or service level; service type; ASA evacuation time; acceptable level of interference to ASA; or location information.

In another embodiment, shown by block 840, UEs that have the UL-2 carrier as the primary carrier are not configured with SR, SRS or CQI/PMI/RI.

In another embodiment, UEs that have the UL-2 carrier as the primary carrier are configured with minimal p0-NominalPUCCH value so as to minimize power of any UE transmission on the PUCCH. See block 830. For example, with p0-NominalPUCCH set at −127 dBm, the UE will transmit with extremely low power even if the UE is at the cell edge. As another example, at the cell edge pathloss of 140 dB, the UE will transmit with 13 dBm of power which is 20 mW. At a more reasonable pathloss of 100 dB, the UE will transmit with −27 dBm of power which is 0.002 mW.

In another embodiment, illustrated by block 845, UEs that have the UL-2 carrier as the primary carrier are periodically triggered, via DCI, to transmit SRS or CQI/PMI/RI.

In another embodiment, shown in block 850, UEs that have the UL-2 carrier as the primary carrier are preemptively scheduled on the PUSCH in order to allow transmission of data buffer status and pending data.

In another embodiment, illustrated by block 855, when the UL-2 carrier is used as the primary carrier, the eNB 175 will assign only one UE to each PUCCH RB. This can minimize the number of UEs transmitting within one RB and therefore minimize the PSD.

Additional possible exemplary embodiments are now described.

An exemplary embodiment includes an apparatus, comprising: means for configuring user equipment to support use of one or more carriers for authorized shared access, wherein the configuring is performed to emphasize use of a first set of a plurality of carriers over use of a second set of the plurality of carriers, wherein the second set comprises the one or more carriers for authorized shared access; and means for communicating with the user equipment using the first and second sets of carriers.

An apparatus as above, wherein the first and second set of carriers are used for one or both of uplink or downlink.

An apparatus as above, wherein the first set of carriers are a first set of uplink carriers and wherein configuring further comprises provisioning the first set of uplink carriers to support a plurality of downlink carriers. The apparatus of this paragraph, wherein the second set of carriers is a second set of uplink carriers and the means for configuring further comprises means for configuring user equipment not supporting carrier aggregation to attach to either a first of the plurality of downlink carriers or a second of the plurality of downlink carriers based on a best downlink carrier as measured by the user equipment, but for configuring the user equipment to always attach to the first set of uplink carriers only.

The apparatus of the previous paragraph, wherein the means for configuring further comprises means for configuring user equipment supporting carrier aggregation to attach to either a first of the plurality of downlink carriers or a second of the plurality of downlink carriers as a downlink primary cell, and to attach to one of the first set of uplink carriers as an uplink primary cell. The apparatus of this paragraph, wherein the means for configuring further comprises means for configuring the user equipment supporting carrier aggregation to attach to one of the second set of uplink carriers, which supports authorized shared access, as an uplink secondary cell. The apparatus of this paragraph, wherein the means for configuring further comprises means for configuring the user equipment supporting carrier aggregation not to attach to one of the second set of uplink carriers, which support authorized shared access.

An apparatus as above, wherein the means for configuring further comprises means for configuring a plurality of physical uplink control channel regions in the first set of uplink carriers to support the plurality of downlink carriers.

An apparatus as above, wherein the means for configuring further comprises means for configuring user equipment not supporting carrier aggregation to be confined to a first of the plurality of downlink carriers, and means for configuring user equipment supporting carrier aggregation to be confined to a second of the plurality of downlink carriers.

An apparatus as above, wherein the means for configuring further comprises means for configuring a plurality of physical random access channel regions in bandwidth of the first set of uplink carriers to support the plurality of downlink carriers.

An apparatus as above, wherein the means for configuring further comprises means for configuring only one physical random access channel region of bandwidth of the first set of uplink carriers to support the plurality of downlink carriers, but for configuring each of the plurality portions of the physical random access channel region to use separate and unique preamble sequence numbers, wherein each portion corresponds to an individual one of the plurality of downlink carriers.

An apparatus as above, wherein the means for configuring further comprises means for configuring a physical uplink shared channel region in bandwidth of the first set of downlink carriers to be split between the plurality of downlink carriers.

An apparatus as above, wherein the first set of carriers is a first set of uplink carriers and wherein the means for configuring further comprises means for adjusting dynamically a size of a physical uplink control channel allocation on the first set of uplink carriers. The apparatus of this paragraph, wherein means for configuring further comprises means for over-provisioning allocation of a physical uplink control channel region in bandwidth of the first set of uplink carriers and means for subsequently adjusting the allocation based on one or more factors. The apparatus of this paragraph, wherein the means for configuring further comprises means for performing resizing of allocation of the physical uplink control channel region based one or more of the following: historical utilization, system load, number of users in the cell, resource block utilization factor, percentage of carrier aggregation-capable and legacy user equipment, authorized shared access evacuation time, acceptable level of interference to authorized shared access, or location information. The apparatus of this paragraph wherein the means for configuring further comprises means for adjusting periodicities of uplink control information reports sent by user equipment on the first set of uplink carriers based on available allocation of a physical uplink control channel region. The apparatus of this paragraph, wherein the means for configuring further comprises means for determining configuration for one or more of a scheduling request indicator, a channel quality indicator, a precoding matrix indicator, a rank indicator, or sounding reference signals for each user equipment based on one or more factors. The apparatus of this paragraph, wherein the means for configuring further comprises means for not configuring some user equipment with uplink control information reporting on a physical uplink control channel portion of bandwidth of the first set of uplink carriers.

An apparatus as above, wherein the second set of carriers is a second set of uplink carriers, and wherein the means for configuring further comprises, responsive to meeting one or more loading criteria corresponding to the first set of uplink carriers, means for configuring certain of the user equipment to use the second set of uplink carriers, for authorized shared access, as one or more primary uplink carriers. The apparatus of this paragraph, wherein the means for configuring further comprises means for configuring the certain user equipment either not to have periodic physical uplink control channel signals on the second set of uplink carriers or with a largest period possible between periodic physical uplink control channels signals sent by the certain user equipment on the second set of uplink carriers. The apparatus of this paragraph, wherein the means for configuring further comprises means for minimizing transmission power of the certain user equipment on the physical uplink control channel on the second set of uplink carriers. The apparatus of this paragraph, wherein the means for configuring further comprises means for selecting the certain user equipment from a plurality of user equipment to have the second set of uplink carriers as one or more primary uplink carriers based on one or more factors. The apparatus of this paragraph, wherein the means for configuring further comprises means for not configuring the certain user equipment that have the second set of uplink carriers as their primary uplink carriers with a scheduling request indicator, a channel quality indicator, a precoding matrix indicator, a rank indicator, or sounding reference signals. The apparatus of this paragraph, wherein the means for configuring further comprises means for periodically triggering, via downlink control information, the certain user equipment that have the second set of uplink carriers as their primary uplink carriers to transmit a scheduling request indicator, a channel quality indicator, a precoding matrix indicator, a rank indicator, or sounding reference signals.

The apparatus of the previous paragraph, wherein the means for configuring further comprises means for scheduling the certain user equipment, which have the second set of uplink carriers as the primary uplink carrier, on a physical uplink control channel of bandwidth of the second set of uplink carriers in order to allow transmission of data buffer status and pending data. The apparatus of the previous paragraph, wherein the means for configuring further comprises means for assigning only one of the certain user equipment to each physical uplink control channel resource block on bandwidth of the second set of uplink carriers.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., device) that may be any media or means that can contain or store the instructions for use by or in connection with an instruction execution system, apparatus, or device, such as a computer. A computer-readable storage medium does not include propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

ACK Acknowledge
ASA Authorized Shared Access
BW BandWidth
CA Carrier Aggregation
CQI Channel Quality Indicator
DCI Downlink Control Information
DL Downlink (from base station to UE)
FCC Federal Communications Commission
FDD Frequency Division Duplex
LTE Long Term Evolution
MHz MegaHertz
MME Mobility Management Entity
ms milliseconds
NCE Network Control Element
PCell Primary Cell
PHY Physical layer
PMI Precoding Matrix Indicator
PRACH Physical Random Access CHannel PSD Power Spectral Density
PUCCH Physical Uplink Control CHannel
PUSCH Physical Uplink Shared CHannel
RACH Random Access Control CHannel
RB Resource Block
Rel Release
RI Rank Indicator
SCell Secondary Cell
RSRP Reference Signal Receive Power
RSRQ Reference Signal Receive Quality
SGW Serving GateWay
SIB System Information Block
SR Scheduling Request indicator
SRS Sounding Reference Signal
TCP/IP Transmission Control Protocol/Internet Protocol
TDD Time Division Duplex
UCI Uplink Control Information
UE User Equipment
UL Uplink (from UE to base station)

What is claimed is:

1. A method, comprising:
configuring user equipment to support use of one or more carriers for authorized shared access,
  wherein the configuring is performed to emphasize use of a first set of a plurality of carriers over use of a second set of the plurality of carriers,
  wherein the second set comprises the one or more carriers for authorized shared access,
  wherein the first set of carriers comprise a certain uplink carrier and wherein configuring further comprises provisioning the certain uplink carrier to support a plurality of downlink carriers, wherein the plurality of downlink carriers occupy different spectrums, and wherein the certain uplink carrier occupies another, different spectrum, and
  wherein the second set of carriers is a second set of uplink carriers and configuring further comprises configuring user equipment not supporting carrier aggregation to attach to either a first of the plurality of downlink carriers or a second of the plurality of downlink carriers, but configuring the user equipment to always attach to the certain uplink carrier only; and
communicating with the user equipment using the first and second sets of carriers.

2. The method of claim 1, wherein configuring further comprises configuring the user equipment not supporting carrier aggregation to attach to either the first of the plurality of downlink carriers or the second of the plurality of downlink carriers is based on a best downlink carrier as measured by the user equipment.

3. The method of claim 1, wherein configuring further comprises configuring user equipment supporting carrier aggregation to attach to either a first of the plurality of downlink carriers or a second of the plurality of downlink carriers as a downlink primary cell, and to attach to the certain uplink carrier as an uplink primary cell.

4. The method of claim 3, wherein configuring further comprises configuring the user equipment supporting carrier aggregation to attach to one of the second set of uplink carriers, which supports authorized shared access, as an uplink secondary cell.

5. The method of claim 3, wherein configuring further comprises configuring the user equipment supporting carrier aggregation not to attach to one of the second set of uplink carriers, which support authorized shared access.

6. The method of claim 1, wherein configuring further comprises configuring a plurality of physical uplink control channel regions in the certain uplink carrier to support the plurality of downlink carriers.

7. The method of claim 1, wherein configuring further comprises configuring user equipment not supporting carrier aggregation to be confined to a first of the plurality of downlink carriers, and configuring user equipment supporting carrier aggregation to be confined to a second of the plurality of downlink carriers.

8. The method of claim 1, wherein configuring further comprises configuring a plurality of physical random access channel regions in bandwidth of the certain uplink carrier to support the plurality of downlink carriers.

9. The method of claim 1, wherein configuring further comprises configuring only one physical random access channel region of bandwidth of the certain uplink carrier to support the plurality of downlink carriers, but configuring each of the plurality portions of the physical random access channel region to use separate and unique preamble sequence numbers, wherein each portion corresponds to an individual one of the plurality of downlink carriers.

10. The method of claim 1, wherein the first set of carriers is a first set of uplink carriers and wherein configuring further comprises adjusting dynamically a size of a physical uplink control channel allocation on the certain uplink carrier.

11. The method of claim 10, wherein configuring further comprises over-provisioning allocation of a physical uplink control channel region in bandwidth of the certain uplink carrier and subsequently adjusting the allocation based on one or more factors.

12. The method of claim 10, wherein configuring further comprises performing resizing of allocation of the physical uplink control channel region based one or more of the following: historical utilization, system load, number of users in the cell, resource block utilization factor, percentage of carrier aggregation-capable and legacy user equipment, authorized shared access evacuation time, acceptable level of interference to authorized shared access, or location information.

13. The method of claim 10, wherein configuring further comprises determining configuration for one or more of a scheduling request indicator, a channel quality indicator, a precoding matrix indicator, a rank indicator, or sounding reference signals for each user equipment based on one or more factors.

14. The method of claim 1, wherein the second set of carriers is a second set of uplink carriers, and wherein configuring further comprises, responsive to meeting one or more loading criteria corresponding to the certain uplink carrier, configuring certain of the user equipment to use the second set of uplink carriers, for authorized shared access, as one or more primary uplink carriers.

15. The method of claim 14, wherein configuring further comprises configuring the certain user equipment either not to have periodic physical uplink control channel signals on the second set of uplink carriers or with a largest period possible between periodic physical uplink control channels signals sent by the certain user equipment on the second set of uplink carriers.

16. The method of claim 14, wherein configuring further comprises minimizing transmission power of the certain user equipment on the physical uplink control channel on the second set of uplink carriers.

17. The method of claim 14, wherein configuring further comprises selecting the certain user equipment from a plurality of user equipment to have the second set of uplink carriers as one or more primary uplink carriers based on one or more factors.

18. The method of claim 1, wherein the first set of carriers do not use authorized shared access.

19. An apparatus, comprising:
one or more processors; and
one or more memories including computer program code,
the one or more memories and the computer program code configured, with the one or more processors, to cause the apparatus to perform at least the following:
configuring user equipment to support use of one or more carriers for authorized shared access,
wherein the configuring is performed to emphasize use of a first set of a plurality of carriers over use of a second set of the plurality of carriers,
wherein the second set comprises the one or more carriers for authorized shared access,
wherein the first set of carriers comprise a certain uplink carrier and wherein configuring further comprises provisioning the certain uplink carrier to support a plurality of downlink carriers, wherein the plurality of downlink carriers occupy different spectrums, and wherein the certain uplink carrier occupies another, different spectrum, and
wherein the second set of carriers is a second set of uplink carriers and configuring further comprises configuring user equipment not supporting carrier aggregation to attach to either a first of the plurality of downlink carriers or a second of the plurality of downlink carriers, but configuring the user equipment to always attach to the certain uplink carrier only; and
communicating with the user equipment using the first and second sets of carriers.

20. A computer program product comprising a non-transitory memory bearing computer program code embodied therein for use with a computer, the computer program code comprising:
code for configuring user equipment to support use of one or more carriers for authorized shared access,
wherein the configuring is performed to emphasize use of a first set of a plurality of carriers over use of a second set of the plurality of carriers,
wherein the second set comprises the one or more carriers for authorized shared access,
wherein the first set of carriers comprise a certain uplink carrier and wherein configuring further comprises provisioning the certain uplink carrier to support a plurality of downlink carriers, wherein the plurality of downlink carriers occupy different spectrums, and wherein the certain uplink carrier occupies another, different spectrum, and
wherein the second set of carriers is a second set of uplink carriers and configuring further comprises configuring user equipment not supporting carrier aggregation to attach to either a first of the plurality of downlink carriers or a second of the plurality of downlink carriers, but configuring the user equipment to always attach to the certain uplink carrier only; and
code for communicating with the user equipment using the first and second sets of carriers.

* * * * *